Figure 5:
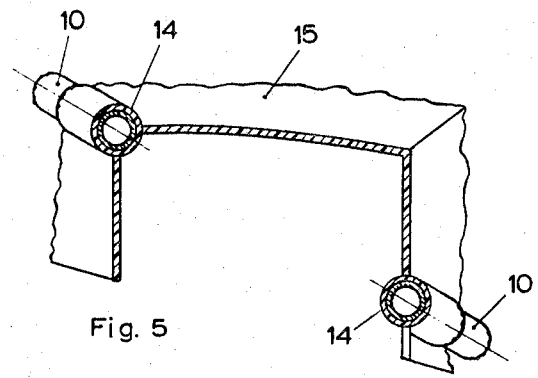

United States Patent [19]

Schwenk

[11] 3,746,387

[45] July 17, 1973

[54] FLOOR ASSEMBLY FOR MOTOR VEHICLES

[75] Inventor: Kurt Schwenk, Wolfsburg, Germany

[73] Assignee: Volkswagenwerk AKG, Wolfsburg, Germany

[22] Filed: June 16, 1971

[21] Appl. No.: 153,640

[30] Foreign Application Priority Data
June 16, 1970 Germany............... P 20 29 665.5

[52] U.S. Cl................. 296/28 F, 52/309, 52/656, 264/45, 264/275, 280/106 R, 296/31 P
[51] Int. Cl............................................. B62d 21/02
[58] Field of Search............ 296/28 R, 28 F, 28 J, 296/31 R, 31 P; 280/106 R; 52/309, 656; 264/45, 263, 275; 425/109, 123, 129

[56] References Cited
UNITED STATES PATENTS

| | | | |
|---|---|---|---|
| 3,054,636 | 9/1962 | Wessels...................... | 280/106 R X |
| 3,458,619 | 7/1969 | Prochaska..................... | 425/129 X |
| 3,331,627 | 7/1967 | Schroder et al.................. | 296/31 P |
| 3,565,480 | 2/1971 | McCollum et al............... | 296/28 R |
| 3,520,550 | 7/1970 | Dysarz et al.................. | 280/106 R |

FOREIGN PATENTS OR APPLICATIONS 910,251 11/1962 Great Britain................... 296/31 P Primary Examiner—Leo Friaglia
Assistant Examiner—Leslie J. Paperner
Attorney—Granville Brumbaugh et al.

[57] ABSTRACT

A floor assembly for motor vehicles comprising a skeleton frame of longitudinal and transverse supports, a layer of plastic material applied by a reaction injection molding process tightly covering each of said supports for interconnecting them to one another while leaving predetermined portions of said supports uncovered to facilitate installation of various motor vehicle elements, the plastic material also being disposed in sheet form horizontally between the supports to serve as a floor for the assembly.

6 Claims, 5 Drawing Figures

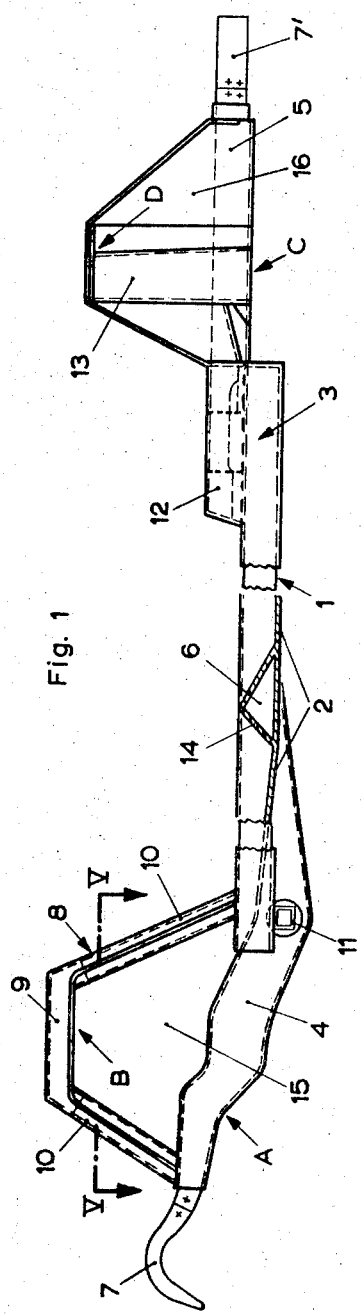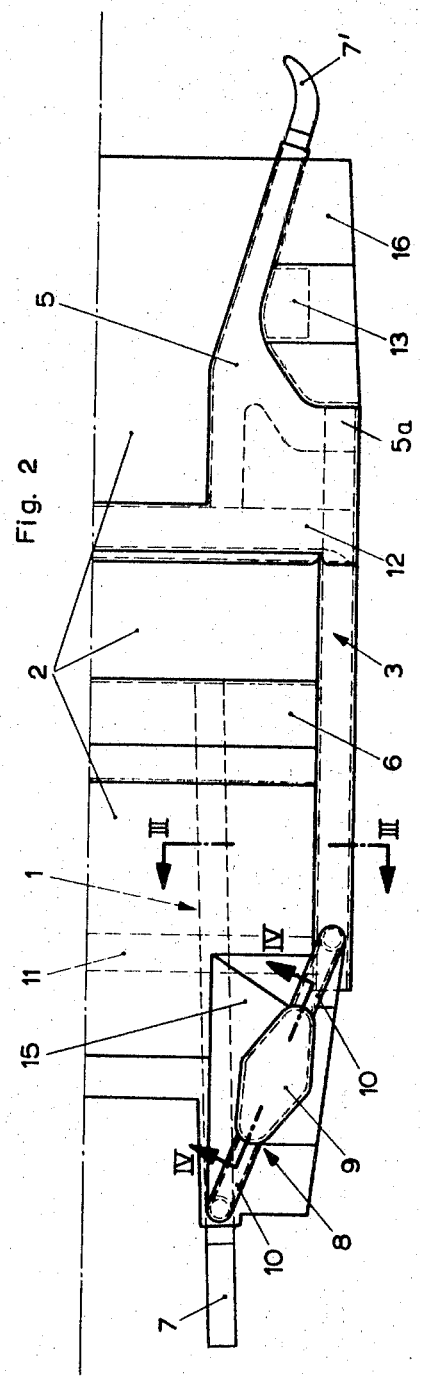

PATENTED JUL 17 1973

3,746,387

SHEET 2 OF 2

INVENTOR,
KURT SCHWENK
BY
Watson, Cole, Grindle &
Watson

FLOOR ASSEMBLY FOR MOTOR VEHICLES

This invention relates to a floor assembly for motor vehicles which consists of a plastic material and a skeleton for the frame composed of metal supports, the outwardly extending longitudinal ones of which are disposed inwardly of the assembly.

In like constructions it has been known to provide a frame of stamped sheet metal frame sections, the longitudinal supports of which are encased by an inner and outer large surfaced shell made of plastic thereby leaving open gaps. The outer shell is attached to the inner shell which is trough-shaped and is attached to the longitudinal supports in such a way as to provide a double floor (see German Patent No. 1,275,372, for example). Such a construction is sufficiently stable and insures a good protection against corrosion, at least for the longitudinal supports, but is expensive to produce since the floor must be prefabricated from several parts and must be attached separately to the longitudinal supports. Connection of the plastic shells with the support frame, for example by means of links staggered with respect to one another, is both time consuming and expensive for large surfaced casing parts. Besides, such a double floor in motor vehicles is apt to reverberate easily.

It has also been known, for a self-supporting floor assembly of porous plastic, to laminate metallic inserts onto the floor assembly for the power supply lines for the motor, the driving mechanism, front and rear axle and superstructures, before the curing of the plastic mass, so that the parts in the finished floor assembly may be easily mounted. Such construction, however, requires the production of thick and expensive walls.

The object of this invention is therefore to simplify the production of such a construction assembly so as to avoid reverberation problems and be relatively easy to construct.

To this end, the floor assembly represents a finished construction unit which is obtained with the use of a reaction injection molding process for the production of the plastic floors, which extends as a single floor between metal supports and forms a plastic layer tightly enclosing all longitudinal as well as all transverse supports of the frame skeleton in a manner whereby predetermined portions of the supports are left uncovered to facilitate installation of various motor vehicle elements.

Besides protecting all metal parts from corrosion, an advantage of such arrangement is that the plastic flooring be produced and safely attached to the skeleton in one work step by simply pouring the skeleton frame into the floor so that the plastic will flow entirely around the metal parts. It is therefore possible to carry out any other smaller or detailed shaping of the floor assembly obtained in such manner. The finished floor assembly referred to herein includes the combination of a metal skeleton with a floor in such a manner as to improve upon the processing technique in this field.

The reaction injection molding process used herein includes injection of the two components of a polyurethene duromer material with the use of a mixing head into the hollow space of the mold. The mixture of raw material will start reacting after a relatively short time while expanding and simultaneously developing pressure. At the same time a smooth, hard cover layer develops at the contact surfaces between plastic and mold, while the intermediate layer has the finely porous structure of hard foam of the traditional type. The mold pressures developing during the reaction amount to about 1 kg/cm$^2$. The floor assembly produced according to this process is relatively light even in the case of fairly thick walls of the actual floor.

Raised sections of the frame skeleton so produced provide a means for simply mounting modern suspension units and provide a corrosion protective layer for the upper mounting of such suspension unit together with wheel boxes, thereby resulting in a further simplified design and casting technique.

The metal skeleton will be effectively built on a base frame in which intermediate longitudinal supports are disposed which project beyond the front and rear of the frame, in pairs, in the manner of brackets and are designed as having hook-shaped free ends not covered with plastic.

The skeleton frame in its forward area is provided on both sides with a support for the suspension of the front axle, which support is in the wall of the front wheel box and which is disposed at one end at the front corner of the base frame. While it is shaped substantially as an arc in a vertical plane, it lies over the free end area of each front middle longitudinal support and is provided at its top with a connector piece for the reception of the end of a suspension unit. This development of the front part of the floor assembly improves upon the safety of the assembly and, because of its shape, can easily fold in the case of a collision. Said supports are provided with a knee or bending place to permit collapsing in the event of a collision.

Also, the above-mentioned hook-shaped free ends are removably secured to the longitudinal supports to facilitate easy repair and replacement thereof.

Figure 3:
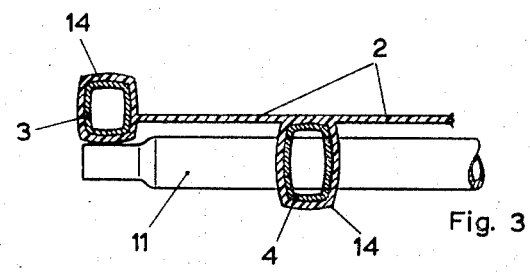
Figure 4:
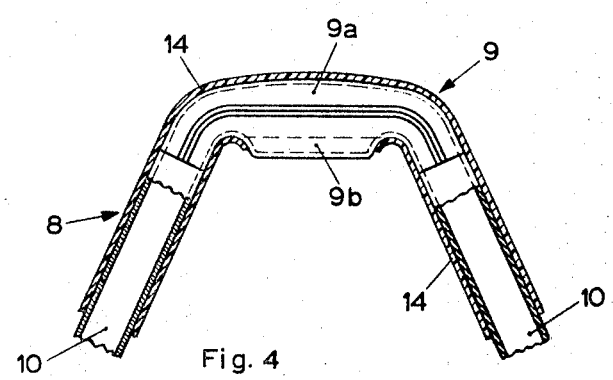

FIG. 1 shows the motor vehicle floor assembly in accordance with the present invention in a partially cut side view, FIG. 2 shows one (symmetrical) half of the floor assembly of FIG. 1 in plan view 5; and FIGS. 3 to 5 are sectional views taken respectively along the lines III—III, IV—IV and V—V of FIGS. 2 and 1, shown on a slightly enlarged scale.

Turning now to the drawings wherein like reference characters refer to like and corresponding parts throughout the several views, there is shown a floor assembly comprised of essentially two parts, namely, a skeleton frame 1 and a plastic floor 2 produced by means of a reaction injection molding process. Frame 1 includes a base frame 3 to which a pair of inner longitudinal rear supports 5 are attached as shown in FIGS. 1 and 2. Supports 4 are connected with and extend forwardly from a middle transverse support 6 at their rearward ends of base frame 3 and are also connected to a front transverse support 11. Supports 5 are combined with a rear transverse support 12 of base frame 3 and the bracket-like end of the lateral longitudinal support 5a. Middle transverse support 6 is designed as a triangle and has an elongated high back which serves as a foot support for the occupants of the rear seating compartment of the motor vehicle. The inner longitudinal supports 4 and 5 have hook-shaped free ends 7 and 7', which are removable. With the exception of the forward transverse support 11, which is made from tubing, skeleton frame 1 consists of sheet metal stampings which form walls for the frame's beam elements. Such walls may be arched inwardly or, as in FIG. 3, outwardly, in order to adequately resist the pressure of the subsequently produced plastic floor.

In order to create a safety body, front middle longitudinal supports 4 are provided at A with a knee or a bending place beneath an elevated support 8 which bridges support 4 with frame 3, the support 8 being elevated in the manner shown in FIGS. 1 and 4 extending from the corner of base frame 3 to the free end of longitudinal support 4. Support 8 comprises struts 10 made of tubing and a sheet metal connector 9 consisting of two sheet metal shells 9a and 9b (FIG. 4). In the event of a collision, supports 4 will bend at A and thereby serve to absorb the force of the impact. In FIG. 2, it can be seen that connector 9 is slightly wider than struts 10 thereby making for easier production and a higher degree of strength.

In order to further allow for buckling and further absorb the force of an impact, the longitudinal supports 4 together with the forward transverse support 11 are disposed below base frame 3 and the rear longitudinal supports 5 together with rear transverse support 12 are disposed above base frame 3.

To facilitate easier attachment of the rear axle, the rear longitudinal supports 5 are each provided with a perpendicularly disposed upwardly projecting sheet metal part 13.

The individual parts of skeleton frame 1 are firmly welded or glued together and subsequently are placed in a correspondingly developed foaming mold. After injection of the plastic mass, the latter flows around skeleton frame 1 on all sides so as to provide both an interconnected assembly and a corrosion protective layer 14 while also constituting a plastic floor 2, rear wheel boxes 16 and front wheel boxes 15 (see FIG. 5). At those places where saturated metal parts fit against the skeleton frame, for example, at point B for the front suspension unit, at points C and D for the rear axle suspension and at end 7 and 7' of the longitudinal supports, the plastic is kept away from the supports in a known manner. It is also possible to combine parts of the skeleton frame together only provisionally by means of welding and to wrap the places of thrust with mats of glass fibers saturate d with synthetic resin, which, upon curing, result in a sufficiently stiff connection. In order to increase the strength of the plastic, glass mats may be inserted into the foaming mold on which skeleton frame 1 is placed. The attachment of a second layer of mats is accomplished subsequently. The mats also can be premolded.

Obviously many other modifications and variations are possible in the light of the above teachings. It is therefore to be understood that within the scope of the appended claims, the invention may be practiced otherwise than as specifically described.

What is claimed is:

1. A floor assembly for motor vehicles comprising a skeleton frame having a base frame and inner longitudinal supports, said base frame having transverse supports and lateral longitudinal supports, all of said supports being firmly attached to each other without the aid of plastic material, and a layer of plastic material tightly covering each of said supports while leaving predetermined portions of said supports uncovered to facilitate installation of various motor vehicle elements, said plastic material also being disposed in sheet form horizontally between said supports to serve as the only floor for the assembly, said plastic material covering said supports and said plastic floor being a single integrally formed member.

2. A floor assembly for motor vehicles comprising a skeleton frame including a base frame, longitudinal and transverse supports and wheel box supports, all of said supports being firmly attached to each other without the aid of plastic material, and a layer of plastic material tightly covering each of said supports while leaving predetermined portions of said supports uncovered to facilitate installation of various motor vehicle elements and tightly covering each of said wheel box supports, said plastic material also being disposed in sheet form over the wheel box supports so as to form wheel boxes and horizontally between said supports to serve as a single floor for the assembly.

3. The floor assembly according to claim 2 wherein said wheel box supports include a pair of front and a pair of rear wheel box supports, each of said front wheel box supports forming a downwardly open arc, said base frame including lateral longitudinal supports and said skeleton frame including inner longitudinal supports having front and rear ends extending outwardly of the front and rear ends of said lateral longitudinal supports, respectively, an end of each said downwardly extending arc being disposed near said outward end of each said inner longitudinal support and another end of each said downwardly extending arc being disposed near said front end of each said lateral longitudinal support, and each of said inner longitudinal supports having a knee portion located near said front end to permit said inner longitudinal supports to bend and thereby absorb the force of impact in the event of a collision.

4. The floor assembly according to claim 2 wherein each of said supports consist of sheet metal stampings formed in the shape of box beams, said box beams having sides that are curved to resist the pressure of said plastic floor.

5. The floor assembly according to claim 2 wherein the skeleton frame also includes inner longitudinal supports, the opposite ends of a pair of said inner longitudinal supports extend outwardly beyond the front and rear ends of said base frame, the outer ends of said inner longitudinal supports being hook-shaped and including said predetermined portions uncovered by said plastic material.

6. The floor assembly according to claim 5 wherein said hook-shaped ends of said inner longitudinal supports are removably mounted thereon.

* * * * *